J. HAY.
MANUFACTURE OF ANVILS.
APPLICATION FILED OCT. 12, 1908.
922,475.
Patented May 25, 1909.
FIG. 1.
FIG. 2.
FIG. 3.
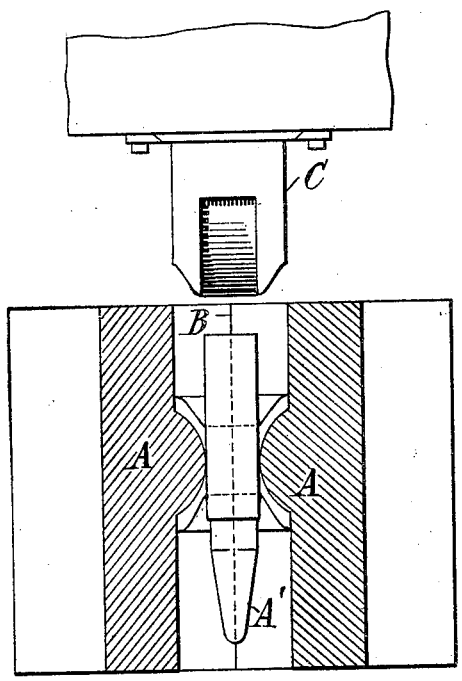
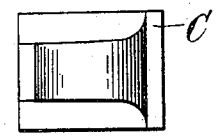
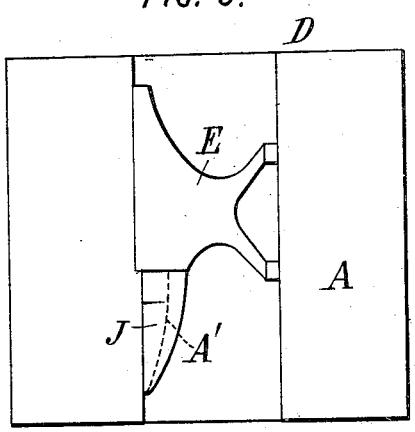
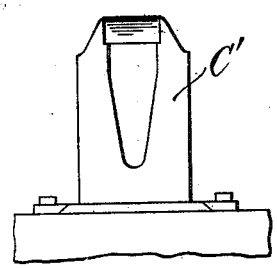
FIG. 4.
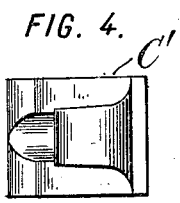
FIG. 5.
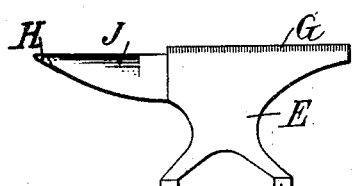
WITNESSES:
René Ruine
William F. Martinez
INVENTOR:
James Hay,
By Attorneys,

UNITED STATES PATENT OFFICE.

JAMES HAY, OF NEW YORK, N. Y.

MANUFACTURE OF ANVILS.

No. 922,475.  Specification of Letters Patent.  Patented May 25, 1909.

Application filed October 12, 1908. Serial No. 457,222.

*To all whom it may concern:*

Be it known that I, JAMES HAY, a citizen of the United States, residing at Richmond Hill, in the borough and county of Queens, city and State of New York, have invented certain new and useful Improvements in the Manufacture of Anvils, of which the following is a specification.

The common practice of making anvils is to make them in two or more pieces welded together. For example, a common type consists of a steel top-plate hardened to a high temper, a horn and body of wrought iron, and a base of wrought iron, all welded together. According to this invention substantially the same relative hardness and toughness of the parts is preserved, while a great economy is effected by forming the body, together with the part corresponding to the top-plate, and preferably also the base, in a single integral mass of steel. The hardness of the top is then secured by heating and quenching. The shape of the anvil is preferably secured by pressing a block to substantially or approximately the desired shape in a press mold, the block being of course heated to a suitable temperature.

Other features of improvement are referred to in detail hereinafter.

The accompanying drawings illustrate the method.

Figure 1 is a cross-section through the mold, indicating the plungers and anvil in elevation. Fig. 2 is an end view of the rear plunger. Fig. 3 is a section at right-angles to Fig. 1, showing the plungers in end elevation. Fig. 4 is an end view of the forward plunger. Fig. 5 is a side elevation of the finished anvil.

Referring to the apparatus illustrated, the die is formed of a pair of sides A A which are separable from each other along the longitudinal plane passing through the longitudinal axis of the head and the corresponding axis of the base of the anvil, as indicated by the dotted line B—B of Fig. 1. The rear part of the anvil is formed by a plunger C reciprocated by hydraulic or other suitable means, and the front part is formed by a corresponding reciprocating plunger C'. Any suitable mechanism may be utilized for securing the relative movements of the plungers and the die, and the opening and closing of the die. The plunger C' forms the horn and the forward faces of the body and base of the anvil. The rear end of the top of the anvil and the rear faces of the body and base are formed by the plunger C. The sides of the mold A form the longitudinal sides of the anvil, and the top curved face of the horn being provided for the latter purpose with projections indicated in dotted lines at A' in Fig. 3. The line A' corresponds with the extreme lateral edge of the horn, as shown in Fig. 1. This arrangement permits the easy entrance and withdrawal of the forward plunger C'.

The block is of steel of a composition best adapted to admit of the forging operation involved and at the same time to permit a subsequent hardening of the top. For example, steel of 0.70 per cent. carbon will be found suitable.

By the process described the entire anvil can be produced in a small fraction of the time necessary for its production by previous methods, and the subsequent operations hereinafter referred to involve only a trifling expense. Upon the completed anvil there is a saving of from 40 to 50 per cent. in the cost, and there is an improvement in the anvil in its entire freedom from joints.

The finished anvil is shown in Fig. 5. The body E and base F are entirely completed in the mold (except for the removal of fins caused by the division lines of the mold). The top G of the anvil is hardened, preferably after withdrawing from the mold, by heating and quenching in water or oil in any usual or suitable way. The point H of the horn J is preferably also drawn out and hardened somewhat after removal from the mold.

Where it is desired to have a base of iron, the process above described may be applied to the making of the body only, the latter being then attached to the base by welding or in any other desired manner.

This invention is designed particularly as an improvement upon the invention shown in the Patent of Ring No. 896,155 of August 18, 1908, in which it is proposed to clamp a T-shaped blank between walls corresponding to the sides and ends of the anvil and to form the latter by means of plungers pressing upon the top and bottom of the anvil. In attempting to make anvils of large size by the Ring process the area of work engaged by the ends of the plungers, and especially the plunger engaging the top of the anvil is very great so that the total pressure required for the operation is enormous. Regardless of the size of the anvil to be made, the making of the T-shaped blank from which the anvil is afterward made is an item of heavy expense, heavier in fact than that of making the anvil from the blank. By arranging the plungers as in my invention so that they engage the ends of the work, the fixed mold being arranged to engage the sides and top and bottom, the plungers require to have a longer stroke but the area of work which they engage is very much less than at the sides or top or bottom of the anvil, and consequently the total pressure required for the plunger is within a practicable limit even for large size anvils. Furthermore, this arrangement has the great advantage from the point of view of economy of operating with blanks which are simple blocks of steel cut from billets of appropriate cross-section, thus avoiding the necessity of shaping an intermediate blank as in the prior process above referred to.

What I claim is:—

The method of manufacture of an anvil which consists in providing a mold corresponding with the shape of the top, bottom and longitudinal sides of the anvil, introducing into said mold a block of steel and forcing said block into the shape of the mold and forming the opposite end faces of the anvil by an endwise pressure from suitably shaped members engaging the opposite end faces of the work.

In witness whereof, I have hereunto signed my name in the presence of two subscribing witnesses.

JAMES HAY

Witnesses:
 DOMINGO A. USINA,
 THEODORE T. SNELL.